United States Patent
Park et al.

(10) Patent No.: US 8,135,079 B2
(45) Date of Patent: Mar. 13, 2012

(54) APPARATUS AND METHOD OF ESTIMATING SIGNAL-TO-NOISE RATIO

(75) Inventors: Hyeong Sook Park, Daejeon (KR); Jun-Woo Kim, Daejeon (KR); Eon Young Hong, Daejeon (KR); Youn Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 763 days.

(21) Appl. No.: 12/177,511

(22) Filed: Jul. 22, 2008

(65) Prior Publication Data
US 2009/0141786 A1 Jun. 4, 2009

(30) Foreign Application Priority Data
Nov. 29, 2007 (KR) .................... 10-2007-0122769

(51) Int. Cl.
*H04K 1/10* (2006.01)

(52) U.S. Cl. ........ 375/260; 375/227; 375/262; 375/267; 375/269; 375/275; 375/278; 375/324; 375/325; 375/341; 375/343; 375/346; 375/347; 375/348; 375/349

(58) Field of Classification Search ............ 375/227, 375/260, 262, 267, 269, 275, 278, 324, 325, 375/341, 343, 346, 347, 349; 370/208, 209, 370/210
See application file for complete search history.

(56) References Cited

U.S. PATENT DOCUMENTS

| | | | |
|---|---|---|---|
| 5,881,098 A * | 3/1999 | Tzou | 375/152 |
| 6,456,653 B1 | 9/2002 | Sayeed | |
| 7,990,839 B2 * | 8/2011 | Cimini et al. | 370/203 |
| 2005/0152480 A1 * | 7/2005 | Chang et al. | 375/343 |
| 2006/0093074 A1 | 5/2006 | Chang et al. | |
| 2008/0008082 A1 | 1/2008 | Ma et al. | |

FOREIGN PATENT DOCUMENTS

| | | |
|---|---|---|
| JP | 2001-333041 A | 11/2001 |
| KR | 10-2002-0089793 A | 11/2002 |
| KR | 10-2003-0016751 A | 3/2003 |
| KR | 10-2005-0074884 A | 7/2005 |
| KR | 10-2006-0062954 A | 6/2006 |
| KR | 10-2006-0071072 A | 6/2006 |

OTHER PUBLICATIONS

Yucek et al. "Noise Plus Interference Power Estimation in Adaptive OFDM Systems." IEEE, 2005.

* cited by examiner

*Primary Examiner* — Dhaval Patel
(74) *Attorney, Agent, or Firm* — Jefferson IP Law, LLP

(57) ABSTRACT

The present invention relates an apparatus and method of estimating a signal-to-noise ratio (SNR) of a received signal when the received signal has a timing offset. An apparatus for estimating a signal-to-noise ratio (SNR) according to an exemplary embodiment of the present invention includes a fast Fourier transform (FFT) unit that performs a fast Fourier transform on a received signal to convert the received signal into a frequency domain signal; a preamble selector that extracts a preamble from the frequency domain signal; a correlator that correlates the preamble to a preamble reference signal generated by a receiver to calculate a correlation value; an entire power estimator that calculates entire power; a noise power estimator that applies a differential demodulation method to the correlation value to remove a timing offset and calculate noise power; and an estimating unit that uses the entire power and the noise power to estimate the signal-to-noise ratio (SNR).

8 Claims, 10 Drawing Sheets

APPARATUS AND METHOD OF ESTIMATING SIGNAL-TO-NOISE RATIO

CROSS-REFERENCE TO RELATED APPLICATION

This application claims priority to and the benefit of Korean Patent Application No. 10-2007-0122769 filed in the Korean Intellectual Property Office on Nov. 29, 2007, the entire contents of which are incorporated herein by reference.

BACKGROUND OF THE INVENTION (a) Field of the Invention

The present invention relates to an apparatus and method of estimating a signal-to-noise ratio (SNR), and more particularly, to an apparatus and method of estimating a signal-to-noise ratio (SNR) of a received signal when the received signal has a timing offset in an OFDM system.

(b) Description of the Related Art

In order to estimate a signal-to-noise ratio (SNR) of a received signal, it is important to calculate accurate noise power. However, if a timing offset exists in the received signal, a phase rotation occurs in a frequency domain, which deteriorates the estimation performance of a signal-to-noise ratio (SNR).

As a technology according to the related art for removing a phase rotation component and estimating a signal-to-noise ratio (SNR), there is a method in which a received signal whose phase rotation component is removed is restored using a time synchronization error calculator and a phase rotation compensator. This method performs a fast Fourier transform (FFT) on a preamble symbol of a received signal, compares the converted signal with a preamble symbol generated by a receiver to calculate a signal-to-noise ratio (SNR), estimates an accurate time error with respect to the received signal having a time error using the time synchronization error calculator and the phase rotation compensator, and restores the phase rotated received signal on the basis of estimated time error information. In this way, an accurate time error can be estimated without installing separate hardware, and a phase error that has occurred is restored on the basis of estimated time error information to calculate an accurate signal-to-noise ratio (SNR). However, this method has a problem in that it is required to detect an accurate time synchronization error, provide a complex multiplier to remove a phase rotation component, and store a value of the phase rotation component.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method of estimating a signal-to-noise ratio (SNR), having advantages of an efficient structure that enables design without installing separate hardware.

An exemplary embodiment of the present invention provides an apparatus for estimating a signal-to-noise ratio (SNR). The apparatus includes: a fast Fourier transform (FFT) unit that performs a fast Fourier transform on a received signal to convert the received signal into a frequency domain signal; a preamble selector that extracts a preamble from the frequency domain signal; a correlator that correlates the preamble to a preamble reference signal generated by a receiver to calculate a correlation value; an entire power estimator that calculates entire power; a noise power estimator that applies a differential demodulation method to the correlation value to remove a timing offset and calculate noise power; and an estimating unit that uses the entire power and the noise power to estimate the signal-to-noise ratio (SNR).

Another exemplary embodiment of the present invention provides a method of estimating a signal-to-noise ratio (SNR). The method includes: performing a fast Fourier transform (FFT) on a received signal to convert the received signal into a plurality of frequency domain signals; extracting a plurality of preambles from the plurality of frequency domain signals; correlating the plurality of preambles to a plurality of preamble reference signals generated by a receiver to calculate a plurality of correlation values; applying a differential demodulation method to the plurality of correlation values to remove phase rotation components; calculating noise power using the plurality of correlation values, from which the phase rotation components have been removed; and estimating the signal-to-noise ratio (SNR) using the noise power.

According to the exemplary embodiments of the present invention, when a received signal has a timing offset, a differential demodulation method is applied in a frequency domain to simply remove the timing offset, which efficiently estimates a signal-to-noise ratio (SNR).

DETAILED DESCRIPTION OF THE EMBODIMENTS

Figure 1:
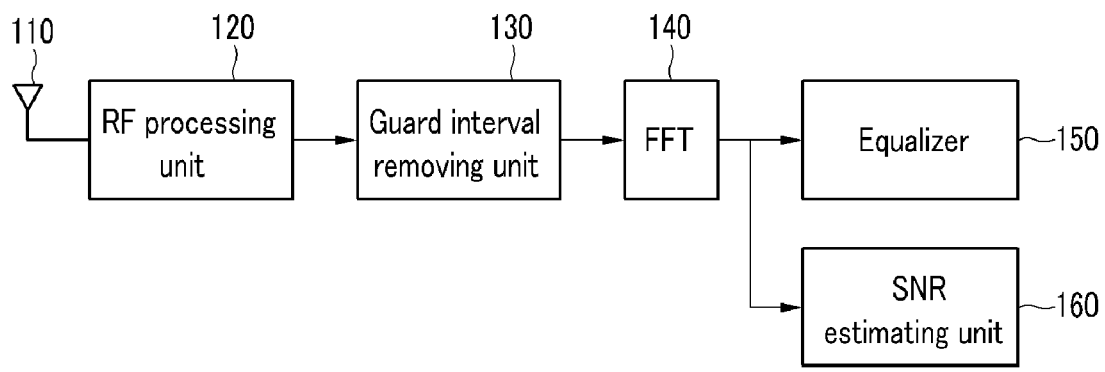
FIG. 1 is a block diagram illustrating a receiver according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er" and -or" described in the specification mean units for processing at least one function and operation and can be implemented by hardware components or software components and combinations thereof.

First, a receiver according to an exemplary embodiment of the present invention will be described. FIG. 1 is a block diagram illustrating a receiver according to an exemplary embodiment of the present invention.

As shown in FIG. 1, a receiver according to an exemplary embodiment of the present invention includes an antenna 110, a radio frequency (RF) processing unit 120, a guard interval removing unit 130, a fast Fourier transform (FFT) unit 140, an equalizer 150, and an SNR estimating unit 160.

The RF processing unit 120 converts a signal that is received by the antenna into a digital baseband signal. The guard interval removing unit 130 removes a guard interval from the digital baseband signal, and the FFT unit 140 performs a fast Fourier transform (FFT) on a time domain symbol, from which the guard interval has been removed, and converts it into a frequency domain signal.

The equalizer 150 performs channel equalization on the frequency domain signal, and the SNR estimating unit 160 extracts a preamble from the frequency domain signal and uses the preamble to estimate an SNR.

Figure 2:
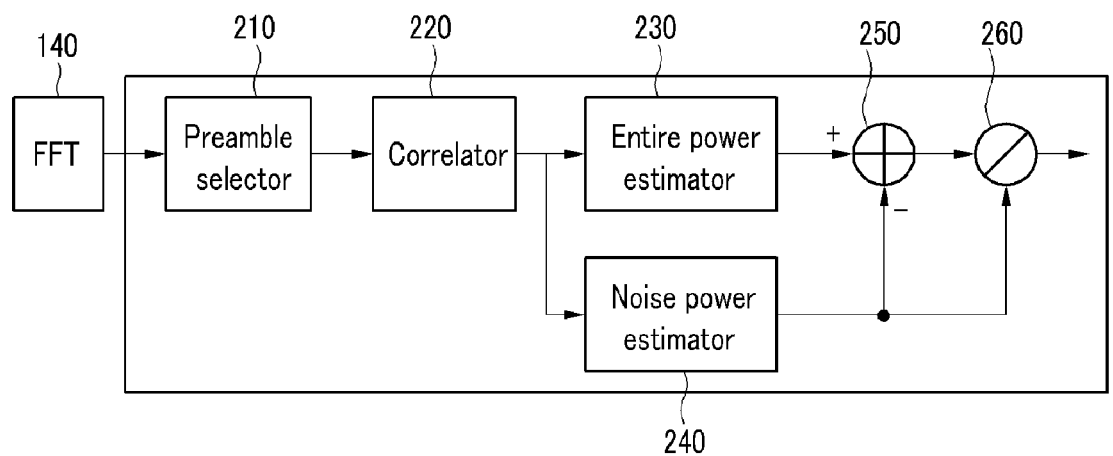
FIG. 2 is a block diagram illustrating an SNR estimating unit according to an exemplary embodiment of the present invention.

Next, an SNR estimating unit of an OFDM receiver according to a first exemplary embodiment of the present invention will be described with reference to FIGS. 2 and 3. FIG. 2 is a block diagram illustrating an SNR estimating unit according to a first exemplary embodiment of the present invention, and FIG. 3 is a block diagram illustrating a noise power estimator according to a first exemplary embodiment of the present invention.

As shown in FIG. 2, the SNR estimating unit according to the first exemplary embodiment of the present invention includes a preamble selector 210, a correlator 220, an entire power estimator 230, a noise power estimator 240, an operator 250, and a divider 260.

The preamble selector 210 extracts a preamble from an output signal from the FFT unit 140, and the correlator 220 correlates the received preamble to a preamble reference signal generated by the receiver to calculate a correlation value. The entire power estimator 230 calculates entire power and the noise power estimator 240 calculates noise power.

Figure 3:
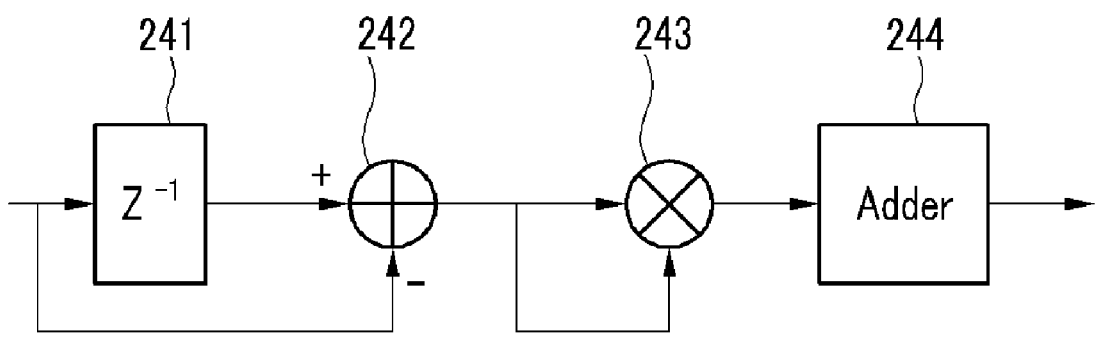
FIG. 3 is a block diagram illustrating a noise power estimator according to an exemplary embodiment of the present invention.

As shown in FIG. 3, the noise power estimator 240 includes a delay unit 241, an operator 242, a multiplier 243, and an adder 244. The delay unit 241 calculates a delay value of an output value from the FFT unit 140, the operator 242 subtracts the output value from the FFT unit 140 by the delay value of the output value from the FFT unit 140, the multiplier 243 squares an output value from the operator 242, and the adder 244 adds a plurality of output values from the operator 242 to calculate noise power.

The operator 250 subtracts the entire power calculated by the entire power estimator 230 by the noise power to calculate signal power, and the divider 260 divides the signal power by the noise power to calculate a signal-to-noise ratio (SNR).

Figure 4:
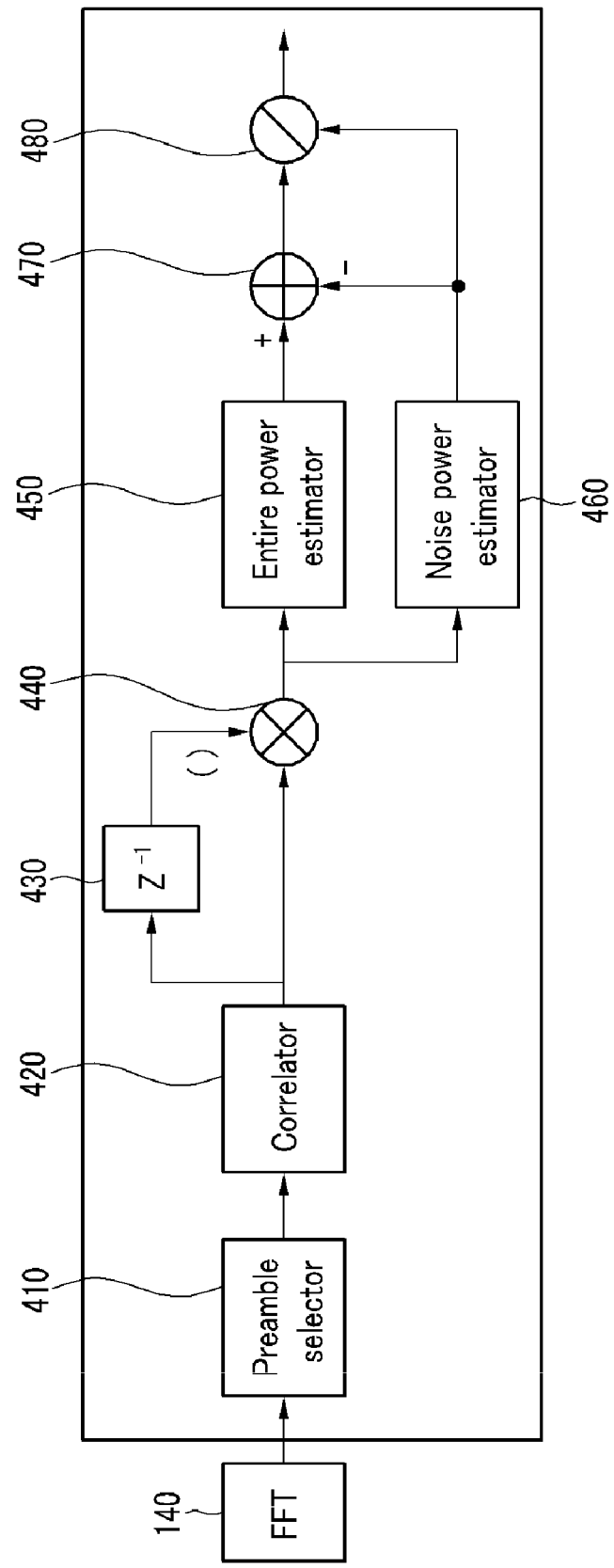
FIG. 4 is a block diagram illustrating an SNR estimating unit according to another exemplary embodiment of the present invention.
Figure 5:
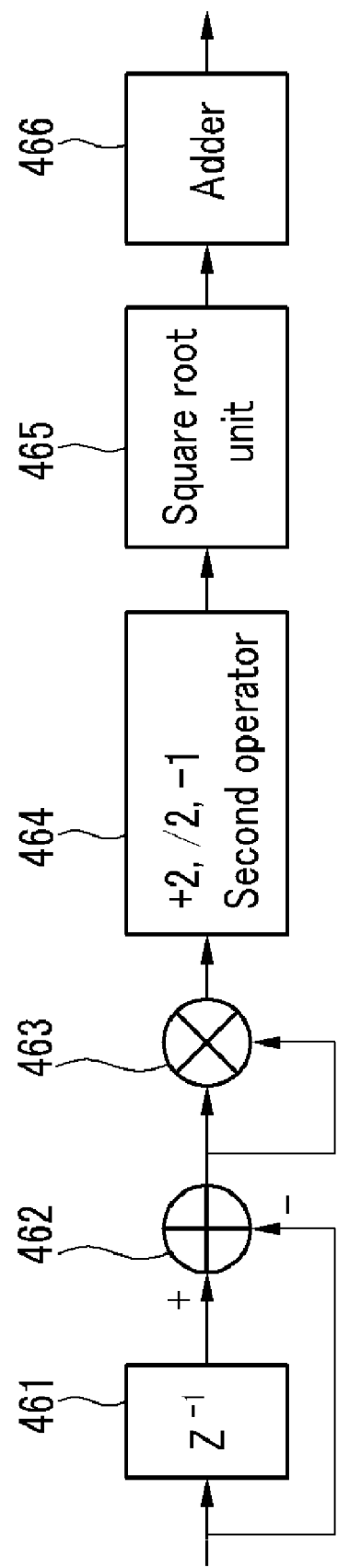
FIG. 5 is a block diagram illustrating a noise power estimator according to another exemplary embodiment of the present invention.

Hereinafter, an SNR estimating unit of an OFDM receiver according to a second exemplary embodiment of the present invention will be described with reference to FIGS. 4 and 5. FIG. 4 is a block diagram illustrating an SNR estimating unit according to a second exemplary embodiment of the present invention, and FIG. 5 is a block diagram illustrating a noise power estimator according to a second exemplary embodiment of the present invention. The SNR estimating unit according to the second exemplary embodiment of the present invention removes a timing offset from a received signal to estimate noise power.

As shown in FIG. 4, the SNR estimating unit according to the second exemplary embodiment of the present invention includes a preamble selector 410, a correlator 420, a delay unit 430, a multiplier 440, an entire power estimator 450, a noise power estimator 460, an operator 470, and a divider 480.

The preamble selector 410 extracts a preamble from an output signal from the FFT unit 140, and the correlator 420 correlates the received preamble to a preamble reference signal generated by the receiver to calculate a correlation value. The delay unit 430 calculates a delay value of the correlation value, and the multiplier 440 multiplies the correction value by the delay value of the correlation value to calculate a first intermediate value ($Z_k$), which is needed to calculate noise power. The entire power estimator 450 calculates entire power, and the noise power estimator 460 uses the first intermediate value ($Z_k$) to calculate noise power.

As shown in FIG. 5, the noise power estimator 460 includes a delay unit 461, a first operator 462, a multiplier 463, a second operator 464, a square root unit 465, and an adder 466.

The delay unit 461 calculates a delay value of the first intermediate value ($Z_k$), the first operator 462 subtracts the delay value of the first intermediate value ($Z_k$) from the first intermediate value ($Z_k$), and the multiplier 463 squares an output value from the first operator 462 to calculate a second intermediate value ($G_k$). The second operator 464 performs an operation on the second intermediate value ($G_k$), the square root unit 465 extracts the square root of an output value from the second operator 464, and the adder 466 adds a plurality of output values from the square root unit 465 to calculate noise power.

The operator 470 subtracts the noise power from the entire power calculated by the entire power estimator 450 to calculate signal power, and the divider 480 divides the signal power by the noise power to calculate a signal-to-noise ratio.

Figure 6:
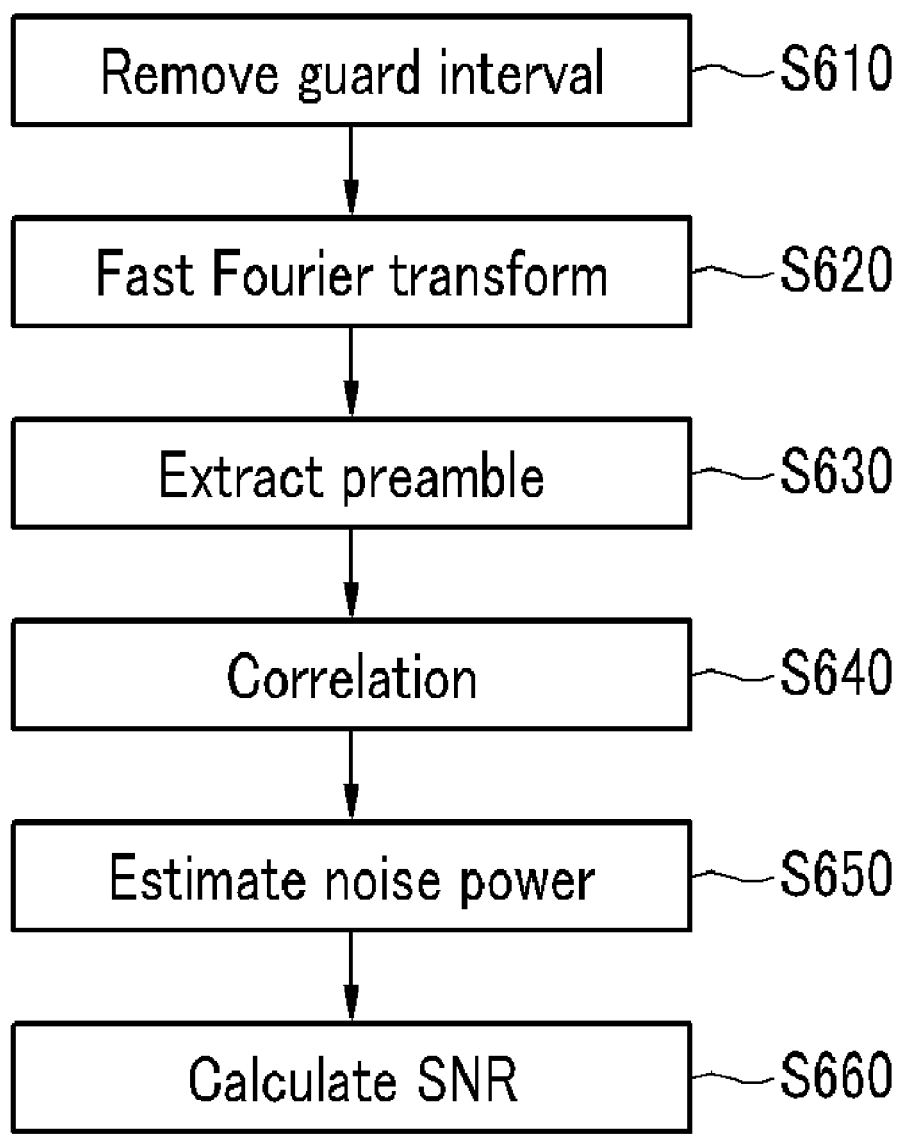
FIG. 6 is a flowchart illustrating a method of estimating a signal-to-noise ratio (SNR) according to an exemplary embodiment of the present invention.

Hereinafter, a method of estimating a signal-to-noise ratio according to a third exemplary embodiment of the present invention will be described with reference to FIG. 6. FIG. 6 is a flowchart illustrating a method of estimating a signal-to-noise ratio (SNR) according to a third exemplary embodiment of the present invention. In the third exemplary embodiment of the present invention, a method of estimating a signal-to-noise ratio when a timing offset does not exist in a received signal will be described.

As shown in FIG. 6, the guard interval removing unit 130 removes a guard interval from the received signal (S610), and the FFT unit 140 performs a fast Fourier transform (FFT) on the signal, from which the guard interval has been removed, and converts the signal into a frequency domain signal (S620). At this time, an output signal from the FFT unit 140 can be represented by Equation 1.

$$Y_k = H_k X_k + N_k, k=1,2,\ldots,N \quad \text{(Equation 1)}$$

In this case, $X_k$ denotes a k-th signal input from an IFFT unit of a transmitter, $H_k$ denotes a channel characteristic, and $N_k$ denotes noise. N denotes a size of the IFFT unit.

The preamble selector 210 extracts a preamble from a frequency domain signal (S630), and the correlator 220 correlates the extracted preamble to a preamble reference signal generated by the receiver (S640).

The noise power estimator 240 estimates noise power (S650). First, the noise power estimator 240 defines an intermediate value of $F_k$ to separate a noise component from the received signal. $F_k$ is defined by Equation 2.

$$F_1 = X_1^* Y_1 - X_2^* Y_2$$

$$F_k = 2X_k^* Y_k - X_{k-1}^* Y_{k-1} - X_{k+1}^* Y_{k+1}, k=2,3,\ldots,N-1$$

$$F_N = X_N^* Y_N - X_{N-1}^* Y_{N-1} \quad \text{(Equation 2)}$$

In this case, X* means a complex conjugate number of X.

Substituting Equation 1 for Equation 2 can result in Equation 3.

$$F_1 = H_1|X_1|^2 - H_2|X_2|^2 + (X_1^* N_1 - X_2^* N_2) = X_1^* N_1 - X_2^* N_2$$

$$F_k = 2H_k|X_k|^2 - H_{k-1}|X_{k-1}|^2 - H_{k+1}|X_{k+1}|^2 + (2X_k^* N_k - X_{k-1}^* N_{k-1} - X_{k+1}^* N_{k+1}) = 2X_k^* N_k - X_{k-1}^* N_{k-1} - X_{k+1}^* N_{k+1}, k=2,3,\ldots,N-1$$

$$F_N = H_N|X_N|^2 - H_{N-1}|X_{N-1}|^2 + (X_N^* N_N - X_{N-1}^* N_{N-1}) = X_N^* N_N - X_{N-1}^* N_{N-1} \quad \text{(Equation 3)}$$

In this case, when it is assumed that channels of adjacent subcarriers are approximately similar to each other, the condition $H_k \approx H_{k-1} \approx H_{k+1}$ is satisfied and the condition $|X_k|^2 = 1$ is satisfied.

When squaring both sides of Equation 3 to calculate noise power, Equation 4 results.

$$F_1^2 = (X_1^* N_1 - X_2^* N_2)^2 + |N_1|^2 + |N_2|^2 \approx 2|N_1|^2$$

$$F_k^2 = 2X_k^* N_k - X_{k-1}^* N_{k-1} - X_{k+1}^* N_{k+1} = 4|N_k|^2 + |N_{k-1}|^2 + |N_{k+1}|^2 \approx 6|N_k|^2, k=2,3,\ldots,N-1$$

$$F_N = X_N^* N_N - X_{N-1}^* N_{N-1} = |N_N|^2 + |N_{N-1}|^2 \approx |N_N|^2 \quad \text{(Equation 4)}$$

A noise power estimation value from Equation 4 can be calculated as represented by Equation 5.

$$\sum_{k=1}^{N} |N_k|^2 = \frac{|F_1|^2}{2} + \frac{|F_N|^2}{2} + \sum_{k=2}^{N-1} \frac{|F_k|^2}{6} \quad \text{(Equation 5)}$$

The SNR estimating unit 160 uses the noise power estimation value to calculate a signal-to-noise ratio (SNR) (S660). An expression that is used to estimate a signal-to-noise ratio (SNR) can be represented by Equation 6.

$$SNR = \frac{\sum_{k=1}^{N} |Y_k|^2 - \sum_{k=1}^{N} |N_k|^2}{\sum_{k=1}^{N} |N_k|^2} \quad \text{(Equation 6)}$$

$$Z_k = S_k * S_{k+1} = (H_k \exp(-j2\pi kl/N) + N_k X_k^*) *$$
$$(H_{k+1} \exp(-j2\pi(k+1)l/N) + N_{k+1} X_{k+1}^*)^*$$
$$= H_k H_{k+1}^* \exp(j2\pi l/N) + H_k \exp(-j2\pi kl/N) N_{k+1}^* X_{k+1}^* +$$
$$H_{k+1} \exp(-j2\pi(k+1)l/N) X_k^* N_k + N_k N_{k+1}^* X_k^* X_{k+1}$$

Figure 7:
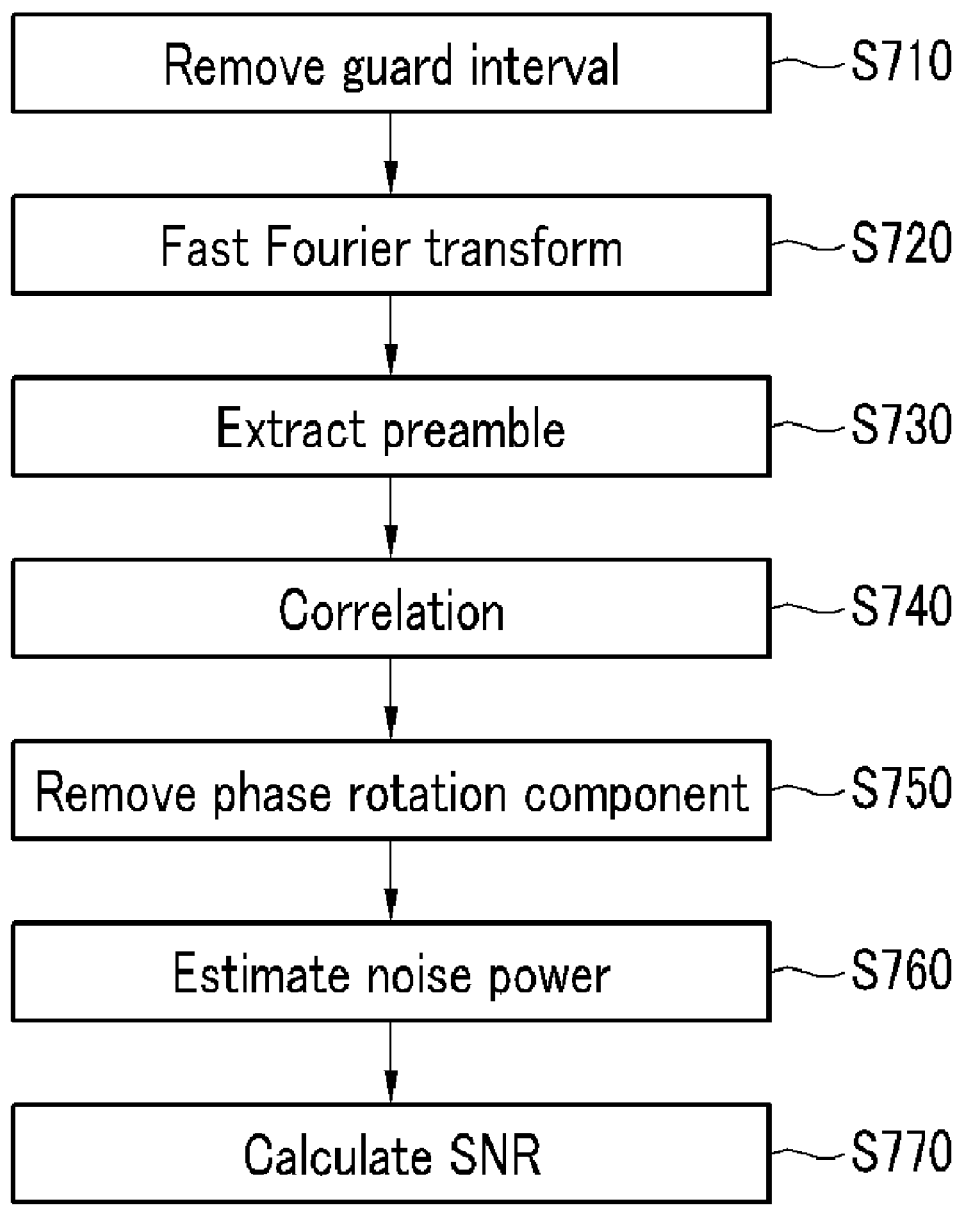
FIG. 7 is a flowchart illustrating a method of estimating a signal-to-noise ratio (SNR) according to another exemplary embodiment of the present invention.

Hereinafter, a method of estimating a signal-to-noise ratio (SNR) according to a fourth exemplary embodiment of the present invention will be described with reference to FIG. 7. FIG. 7 is a flowchart illustrating a method of estimating a signal-to-noise ratio (SNR) according to a fourth exemplary embodiment of the present invention. In the fourth exemplary embodiment of the present invention, a method of estimating a signal-to-noise ratio (SNR) when a timing offset exists in a received signal will be described.

As shown in FIG. 7, the guard interval removing unit 130 removes a guard interval from a received signal (S710), and the FFT unit 140 performs a fast Fourier transform (FFT) on the signal, from which the guard interval has been removed, and converts the signal into a frequency domain signal (S720). At this time, an output signal from the FFT unit 140 can be represented by Equation 7.

$$Y_k = H_k \exp(-j2\pi kl/N) X_k + N_k \quad \text{(Equation 7)}$$

In this case, when $\tau$ is a delay and $T_s$ is a sampling time, an analog signal $x(t-\tau)$ received from an antenna 110 is a signal delayed by $\tau$, and the condition $\tau = lT_s$ is satisfied.

The preamble selector 410 extracts a preamble from a frequency domain signal (S730), and the correlator 420 correlates the extracted preamble to a preamble reference signal generated by the receiver (S740). A correlation value ($S_k$) can be represented by Equation 8.

$$S_k = H_k \exp(-j2\pi kl/N)|X_k|^2 + N_k X_k^* \quad \text{(Equation 8)}$$

The timing offset appears as a phase rotation component in a frequency domain. In this case, since the phase rotation component deteriorates the estimation performance of a signal-to-noise ratio (SNR), the SNR estimating unit 160 uses a differential demodulation method to remove the phase rotation component (S750).

First, the SNR estimating unit 160 defines a first intermediate value ($Z_k$) that is used to calculate noise power. The first intermediate value ($Z_k$) is defined by Equation 9.

$$Z_k = S_k * S_{k+1} = (H_k \exp(-j2\pi kl/N) + N_k X_k^*) * \quad \text{(Equation 9)}$$
$$(H_{k+1} \exp(-j2\pi(k+1)l/N) + N_{k+1} X_{k+1}^*)^*$$
$$= H_k H_{k+1}^* \exp(j2\pi l/N) + H_k \exp(-j2\pi kl/N) N_{k+1}^* X_{k+1}^* +$$
$$H_{k+1} \exp(-j2\pi(k+1)l/N) X_k^* N_k + N_k N_{k+1}^* X_k^* X_{k+1}$$

In this case, when it is assumed that channels of adjacent subcarriers are approximately similar to each other, the condition $H_k \approx H_{k-1} \approx H_{k+1}$ is satisfied. If N is large, the condition $\exp(-j2\pi kl/N) \approx \exp(-j2\pi(k+1)l/N) \approx \exp(-j2\pi(k+2)l/N)$ may be assumed.

Next, the SNR estimating unit 160 uses the first intermediate value ($Z_k$) to define a second intermediate value ($G_k$). The second intermediate value ($G_k$) is defined by Equations 10 to 12.

$$G_1 = |Z_1 - Z_2|^2 = \quad \text{(Equation 10)}$$

$$\begin{vmatrix} H_1 \exp(-j2\pi l/N) N_2^* X_2^* - \\ H_2 \exp(-j2\pi(2)l/N) N_3^* X_3^* + \\ H_2 \exp(-j2\pi(2)l/N) N_1 N_3^* X_2^* X_3 - \\ H_3 \exp(-j2\pi(3)l/N) N_2 X_2^* + \\ N_1 N_2^* X_1^* X_2 - N_2 N_3^* X_2^* X_3 \end{vmatrix}^2$$

$$= |H_1|^2 (|N_2|^2 |X_2|^2 + |N_3|^2 |X_3|^2 +$$

$$|N_1|^2 |X_1|^2 + |N_2|^2 |X_2|^2) +$$

$$|N_1|^2 |N_2|^2 |X_1|^2 |X_2|^2 + |N_2|^2 |N_3|^2 |X_2|^2 |X_3|^2$$

$$\approx 2|N_2|^2 + |N_3|^2 + |N_1|^2 + |N_1|^2 |N_2|^2 + |N_2|^2 |N_3|^2$$

$$= 4|N_1|^2 + 2|N_1|^4$$

$$= 2(|N_1|^2 + 1)^2 - 2$$

In this case, an average value of noise components is 0 and the noise components are independent from each other. Thus, a cross product component in a square term becomes zero. That is, the condition $N_k N_m = 0$ is satisfied. It is assumed that the expectation of channel is given as $$E[|H_k|^2] = \sum_{n=0}^{N_g} E[|h_n|^2] = 1$$

for the AWGN channel.

$$G_N = |Z_N - Z_{N-1}|^2 = 4|N_N|^2 + 2|N_N|^4 = 2(|N_N|^2+1)^2 - 2 \quad \text{(Equation 11)}$$

$$G_k = |2^*Z_k - Z_{k-1} - Z_{k+1}|^2 = 12|N_k|^2 + 6|N_k|^4 = 6(|N_k|^2+1)^2 - 6 \quad \text{(Equation 12)}$$

The noise power estimator 460 estimates noise power using the second intermediate value ($G_k$) from which a phase rotation component has been removed (S760). The noise power estimation value can be calculated by Equation 13.

$$\sum_{k=1}^{N} |N_k|^{22} = \left(\sqrt{\frac{G_1+2}{2}} - 1\right) + \sum_{k=2}^{N-1}\left(\sqrt{\frac{G_k+6}{6}} - 1\right) + \left(\sqrt{\frac{G_N+2}{2}} - 1\right) \quad \text{(Equation 13)}$$

The SNR estimating unit 160 uses the noise power estimation value to calculate a signal-to-noise ratio (SNR) (S770). An expression that is used to estimate a signal-to-noise ratio (SNR) can be represented by Equation 14.

$$SNR = \frac{\sum_{k=1}^{N}|Z_k|^2 - \sum_{k=1}^{N}|N_k|^2}{\sum_{k=1}^{N}|N_k|^2} \quad \text{(Equation 14)}$$

Figure 8:
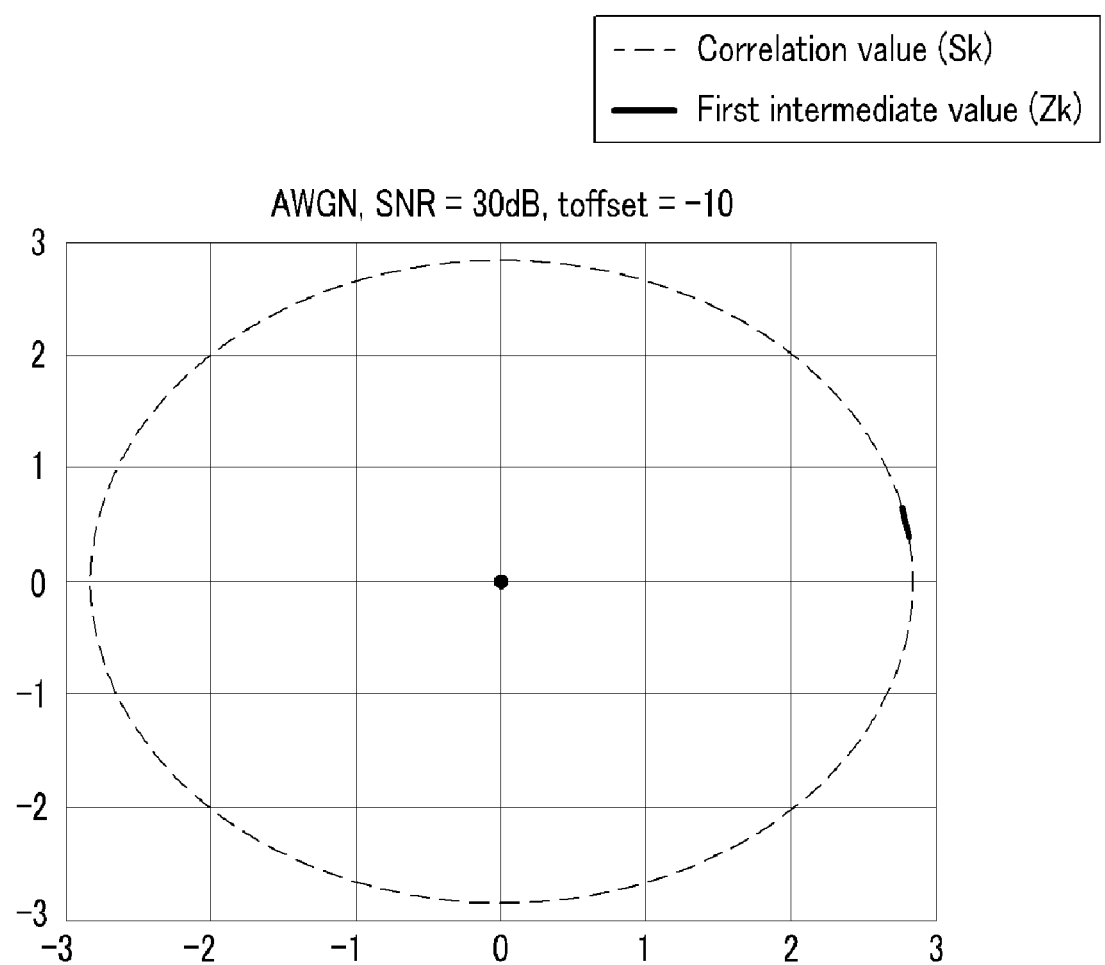
FIG. 8 is a diagram illustrating a state where a correlation value ($S_k$) and a first intermediate value ($Z_k$) are shown on a complex plane.

FIG. 8 is a diagram illustrating a state where a correlation value ($S_k$) and a first intermediate value ($Z_k$) are shown on a complex plane.

Specifically, FIG. 8 shows a case where a timing offset is 10 and a signal-to-noise ratio (SNR) is 30 dB in an additive white Gaussian noise (AWGN) channel status. In FIG. 8, a horizontal axis and a vertical axis indicate magnitudes of signals, a dotted line indicates a size of a correlation value ($S_k$), and a solid line indicates a size of a first intermediate value ($Z_k$).

As shown in FIG. 8, it can be seen that the correlation value ($S_k$) is subjected to a frequency rotation in a frequency domain, but a phase rotation component is removed from the first intermediate value ($Z_k$) where a differential demodulation method is applied.

Figure 9:
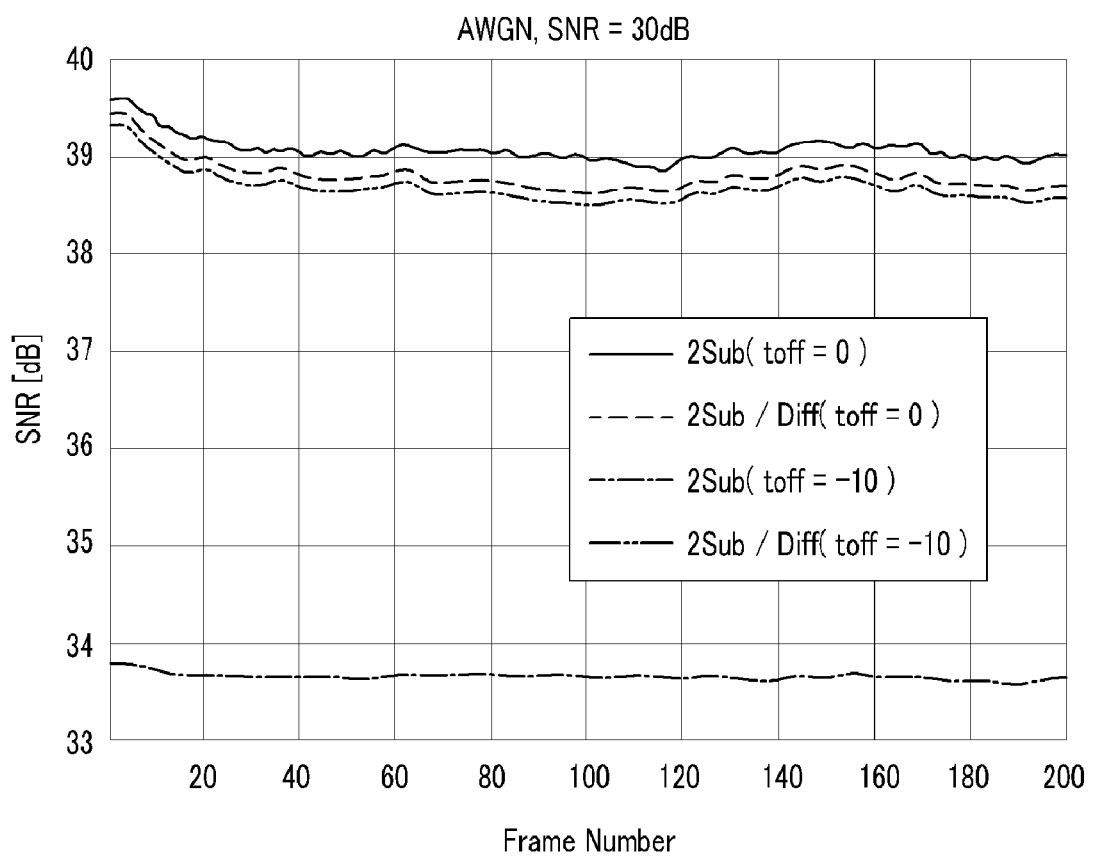
FIG. 9 is a diagram illustrating a result that is obtained by estimating a signal-to-noise ratio (SNR) according to an exemplary embodiment of the present invention, when the signal-to-noise ratio is 30 dB.
Figure 10:
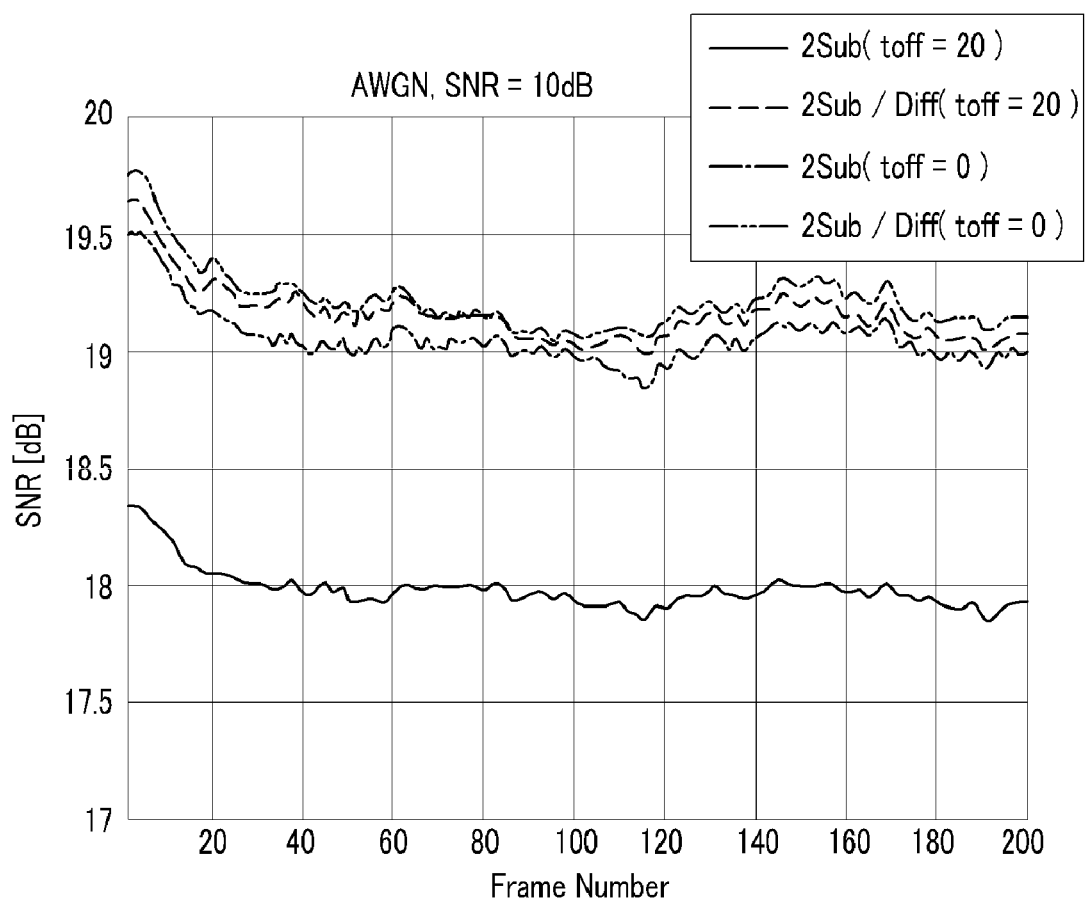
FIG. 10 is a diagram illustrating a result that is obtained by estimating a signal-to-noise ratio (SNR) according to an exemplary embodiment of the present invention, when the signal-to-noise ratio is 10 dB.

FIG. 9 is a diagram illustrating a result that is obtained by estimating a signal-to-noise ratio according to an exemplary embodiment of the present invention when the signal-to-noise ratio is 30 dB. FIG. 10 is a diagram illustrating a result that is obtained by estimating a signal-to-noise ratio (SNR) according to an exemplary embodiment of the present invention when the signal-to-noise ratio is 10 dB. FIGS. 9 and 10 show results that are obtained by simulating a method of estimating a signal-to-noise ratio (SNR) according to a third exemplary embodiment of the present invention, and a method of estimating a signal-to-noise ratio (SNR) according to a fourth exemplary embodiment of the present invention in an additive white Gaussian noise (AWGN) channel status, respectively.

In FIG. 9, when toff as a timing offset value is 0, the method of estimating a signal-to-noise ratio (SNR) according to the third exemplary embodiment of the present invention is similar to the method of estimating a signal-to-noise ratio (SNR) according to the fourth exemplary embodiment of the present invention in terms of performance. When toff is −10, the method of estimating a signal-to-noise ratio (SNR) according to the fourth exemplary embodiment of the present invention is superior to the method according to the third exemplary embodiment of the present invention.

In FIG. 10, when toff as a timing offset value is 0, the method of estimating a signal-to-noise ratio (SNR) according to the third exemplary embodiment of the present invention is similar to the method of estimating a signal-to-noise ratio (SNR) according to the fourth exemplary embodiment of the present invention in terms of performance. When toff is −20, the method of estimating a signal-to-noise ratio (SNR) according to the fourth exemplary embodiment of the present invention is superior to the method according to the third exemplary embodiment of the present invention.

The exemplary embodiment of the present invention that has been described above may be implemented by not only an apparatus and a method but also a program capable of realizing a function corresponding to the structure according to the exemplary embodiment of the present invention and a recording medium having the program recorded therein. It can be understood by those skilled in the art that the implementation can be easily made from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for estimating a signal-to-noise ratio (SNR), comprising:
    a fast Fourier transform (FFT) unit for performing a fast Fourier transform on a received signal to convert the received signal into a frequency domain signal;
    a preamble selector for extracting a preamble from the frequency domain signal;
    a correlator for correlating the preamble to a preamble reference signal generated by a receiver to calculate a correlation value;
    an entire power estimator for calculating entire power;
    a first delay unit for calculating a delay value of the correlation value;
    a first multiplier for multiplying the correlation value by the delay value of the correlation value to calculate a first intermediate value;
    a noise power estimator for calculating noise power using the first intermediate value and a delay value of the first intermediate value; and
    an estimating unit for using the entire power and the noise power to estimate the signal-to-noise ratio (SNR).

2. The apparatus of claim 1, wherein the noise power estimator includes:
    a delay unit for calculating the delay value of the first intermediate value;
    a first operator for subtracting the first intermediate value by the delay value of the first intermediate value;

a second multiplier for squaring an output value from the first operator to calculate a second intermediate value;

a second operator for performing an operation on the second intermediate value;

a square root unit for extracting a square root of an output value from the second operator; and an adder for adding a plurality of output values from the square root unit to calculate the noise power.

3. The apparatus of claim 2, wherein the estimating unit that estimates the signal-to-noise ratio (SNR) includes:

a third operator for subtracting the entire power by the noise power to calculate signal power; and a divider for dividing the signal power by the noise power to calculate the signal-to-noise ratio (SNR).

4. The apparatus of claim 2, further comprising:

an RF processing unit for converting the received signal into a digital baseband signal; and a guard interval removing unit for removing a guard interval from the digital baseband signal.

5. A method of estimating a signal-to-noise ratio (SNR), comprising:

performing a fast Fourier transform (FFT) on a received signal to convert the received signal into a plurality of frequency domain signals;

extracting a plurality of preambles from the plurality of frequency domain signals;

correlating the plurality of preambles to a plurality of preamble reference signals generated by a receiver to calculate a plurality of correlation values;

calculating a plurality of delay values of the plurality of correlation values;

multiplying the plurality of correlation values by the plurality of delay values to calculate a plurality of first intermediate values;

calculating noise power using a plurality of second intermediate values which are calculated from the plurality of first intermediate values and delay values of some of the first intermediate values; and estimating the signal-to-noise ratio (SNR) using the noise power.

6. The method of claim 5, wherein the calculating of the noise power includes:

calculating delay values of values corresponding to an initial value and a last value included in the plurality of second intermediate values among the plurality of first intermediate values, and squaring differences between the values corresponding to an initial value and a last value among the plurality of first intermediate values and the delay values thereof to calculate the second intermediate values; and squaring values, which are obtained by subtracting, from values that are twice values corresponding to the other values included in the plurality of second intermediate values among the plurality of first intermediate values, previous values and following values of the values corresponding to the other values among the plurality of first intermediate values, to calculate the second intermediate values.

7. The method of claim 6, wherein the calculating of the noise power further includes:

using the plurality of second intermediate values to calculate a plurality of noise power elements; and adding the plurality of noise power elements to calculate the noise power.

8. The method of claim 6, wherein the estimating of the signal-to-noise ratio (SNR) includes:

adding the plurality of first intermediate values to calculate entire power;

subtracting the noise power from the entire power to calculate signal power; and dividing the signal power by the noise power to calculate the signal-to-noise ratio (SNR).

* * * * *